(12) United States Patent
Bunel et al.

(10) Patent No.: US 9,091,445 B2
(45) Date of Patent: Jul. 28, 2015

(54) GUIDING A SPARKPLUG IN A TURBINE ENGINE COMBUSTION CHAMBER

(75) Inventors: Jacques Marcel Arthur Bunel, Moissy-Cramayel Cedex (FR); Mario Cesar De Sousa, Moissy-Cramayel Cedex (FR); Nicolas Christian Raymond Leblond, Moissy-Cramayel Cedex (FR); Guillaume Sevi, Moissy-Cramayel Cedex (FR); Denis Jean Maurice Sandelis, Moissy-Cramayel Cedex (FR); Christophe Pieussergues, Moissy-Cramayel Cedex (FR)

(73) Assignee: SNECMA, Paris (FR)

( * ) Notice: Subject to any disclaimer, the term of this patent is extended or adjusted under 35 U.S.C. 154(b) by 632 days.

(21) Appl. No.: 13/512,802

(22) PCT Filed: Dec. 3, 2010

(86) PCT No.: PCT/FR2010/052606
§ 371 (c)(1),
(2), (4) Date: May 30, 2012

(87) PCT Pub. No.: WO2011/080433
PCT Pub. Date: Jul. 7, 2011

(65) Prior Publication Data
US 2012/0255275 A1    Oct. 11, 2012

(30) Foreign Application Priority Data

Dec. 16, 2009 (FR) .................................. 09/06092
Mar. 29, 2010 (FR) .................................. 10/01260

(51) Int. Cl.
*F02C 7/266* (2006.01)
*F23R 3/60* (2006.01)
(Continued)

(52) U.S. Cl.
CPC . *F23R 3/50* (2013.01); *F02C 7/266* (2013.01); *F23R 3/002* (2013.01); *F23R 3/60* (2013.01); *F23D 2207/00* (2013.01)

(58) Field of Classification Search
CPC .............. F23R 3/002; F23R 3/60; F23R 3/06; F23R 3/50; F02C 7/266; F23D 2207/00
USPC .......................................... 60/39.827, 39.821
See application file for complete search history.

(56) References Cited

U.S. PATENT DOCUMENTS 3,007,312 A * 11/1961 Shutts ........................ 60/39.821
3,911,672 A    10/1975 Irwin
(Continued)

FOREIGN PATENT DOCUMENTS

EP    1 975 512    10/2008
EP    2 088 374    12/2009

OTHER PUBLICATIONS

International Search Report Issued Aug. 10, 2011 in PCT/FR10/052606 Filed Dec. 3, 2010.

*Primary Examiner* — William H Rodriguez
(74) *Attorney, Agent, or Firm* — Oblon, McClelland, Maier & Neustadt, L.L.P.

(57) ABSTRACT

A turbine engine combustion chamber including at least one ignition sparkplug carried by an outer casing and extending through a guide mechanism carried by a wall forming a body of revolution of the chamber. The guide mechanism includes a tubular guide having the sparkplug passing axially therethrough, which guide is mounted with axial and transverse clearance on a chimney fastened to the wall of the chamber and opening out therein. The guide includes an annular collar engaged with clearance in an internal annular groove of the chimney. The annular collar is urged to press against a wall of the groove by a resilient member mounted in the groove.

12 Claims, 7 Drawing Sheets

(51) Int. Cl.
*F23R 3/50* (2006.01)
*F23R 3/00* (2006.01)

(56) References Cited

U.S. PATENT DOCUMENTS

| 5,765,833 | A | 6/1998 | Able et al. | |
|---|---|---|---|---|
| 6,438,940 | B1* | 8/2002 | Vacek et al. | 60/204 |
| 6,442,929 | B1* | 9/2002 | Kraft et al. | 60/39.827 |
| 2003/0163995 | A1* | 9/2003 | White | 60/800 |
| 2004/0104538 | A1* | 6/2004 | Pidcock et al. | 277/549 |
| 2005/0072163 | A1* | 4/2005 | Wells et al. | 60/796 |
| 2006/0255549 | A1* | 11/2006 | Amos et al. | 277/644 |
| 2007/0068166 | A1* | 3/2007 | Gautier et al. | 60/752 |
| 2009/0064657 | A1 | 3/2009 | Zupanc et al. | |
| 2009/0151361 | A1* | 6/2009 | Audin et al. | 60/796 |
| 2009/0199564 | A1 | 8/2009 | Pieussergues et al. | |
| 2010/0212324 | A1* | 8/2010 | Bronson et al. | 60/752 |
| 2011/0120132 | A1* | 5/2011 | Rudrapatna et al. | 60/752 |
| 2012/0227373 | A1* | 9/2012 | Bunel et al. | 60/39.827 |
| 2013/0195546 | A1* | 8/2013 | Ponziani et al. | 403/327 |
| 2014/0137568 | A1* | 5/2014 | Bunel et al. | 60/796 |

* cited by examiner

GUIDING A SPARKPLUG IN A TURBINE ENGINE COMBUSTION CHAMBER

The present invention relates essentially to guiding a sparkplug in an annular combustion chamber of a turbine engine, such as an airplane turboprop or turbojet.

An annular turbine engine combustion chamber comprises an annular chamber end wall that is connected to two coaxial shrouds substantially forming bodies of revolution that extend downstream, together with a fairing or covering that is fastened to the chamber end wall and that extends upstream.

The fairing guides the air stream delivered by the compressor of the turbine engine and splits it between a central passage feeding the combustion chamber and two outer passages that go around the combustion chamber.

The air from the compressor is taken into the combustion chamber where it is mixed with fuel, the combustion of the mixture being initiated by at least one sparkplug mounted on an outer casing and passing through an orifice in the outer shroud.

In order to seal the combustion chamber at this orifice, it is known to mount guide means in the orifice that comprise a tubular guide having the sparkplug passing axially therethrough and mounted with axial and transverse clearance in a chimney that is fastened to the outer shroud of the combustion chamber and that opens out into the combustion chamber via the above-mentioned orifice.

The clearance accommodates axial and radial movements between the combustion chamber and the outer casing as a result of their differential expansion during different stages of flight, without causing the sparkplug to come into abutment or press against the edges of the orifice in the outer shroud of the combustion chamber.

There is also functional clearance between the guide and the sparkplug so as to allow the guide to be moved in translation relative to the sparkplug.

The guide extends in a peripheral passage defined by the outer casing and the combustion chamber, such that the air flowing in said passage presses the guide against the sparkplug. The contact between the cylindrical inside surface of the guide and the vertical outside surface of the sparkplug is situated on the side that is upstream relative to the flow of air.

Since the dimensions of the contact zone are small, the contact pressure or hertzian contact stress is high.

In addition, the vibration and the above-mentioned air flow tend to cause the guide to turn around the sparkplug.

This gives rise to premature wear of the sparkplug in the zone of contact between the guide and the sparkplug.

A particular object of the invention is to provide a solution to this problem that is simple, effective, and inexpensive.

To this end, the invention provides a turbine engine combustion chamber including at least one ignition sparkplug carried by an outer casing and extending through guide means carried by a wall forming a body of revolution of the chamber, the guide means comprising a tubular guide having the sparkplug passing axially therethrough, which guide is mounted with axial and transverse clearance on a chimney fastened to the wall of the chamber and opening out therein, the guide having an annular collar engaged with clearance in an internal annular groove of the chimney, the combustion chamber being characterized in that the annular collar is urged to press against a wall of the groove by a resilient member mounted in the groove.

The resilient member serves to limit the vibration of the guide in operation and thus to limit wear of the sparkplug. Nevertheless, it allows the guide to move relative to the chimney, in order to compensate the expansions that take place during different stages of flight.

Advantageously, the resilient member is a spring or a spring washer, e.g. of the type having a C-shaped or an Omega-shaped (Ω-shaped) section.

According to another characteristic of the invention, the annular groove is defined by two parallel walls that are substantially radial relative to the axis of the chimney, the resilient member being placed in an annular groove formed in one of said walls.

The resilient member is then pressed against the end wall of the groove and against the collar of the guide that is housed in the groove of the chimney.

In a preferred embodiment of the invention, a wall of the groove is formed by a radial annular rim of the chimney and the resilient member is housed in a groove in said rim, while the wall of the groove against which the collar is pressed by the resilient member is formed by an annular plate fastened to the rim of the chimney.

In a variant embodiment of the invention, the resilient member is a spring blade of undulating shape.

The spring blade may comprise an annular central zone surrounding the tubular guide, together with two ends bearing against two opposite support tabs of the tubular guide extending radially outwards from the collar.

Preferably, the chimney has two openings through which there extend the support tabs of the tubular guide and the ends of the spring blade.

The wall of the groove against which the collar of the guide is pressed is formed by a radial annular rim of the chimney, the spring blade bearing against an opposite wall of the groove.

According to a characteristic of the invention, the opposite wall of the groove includes a setback of shape complementary to the shape of the spring blade and designed to hold it in position.

The invention also provides a turbine engine such as a turboprop or a turbojet, the engine including an annular combustion chamber of the invention.

The invention can be better understood and other details, characteristics, and advantages appear better on reading the following description made by way of non-limiting example with reference to the accompanying drawings, in which.

Figure 1:
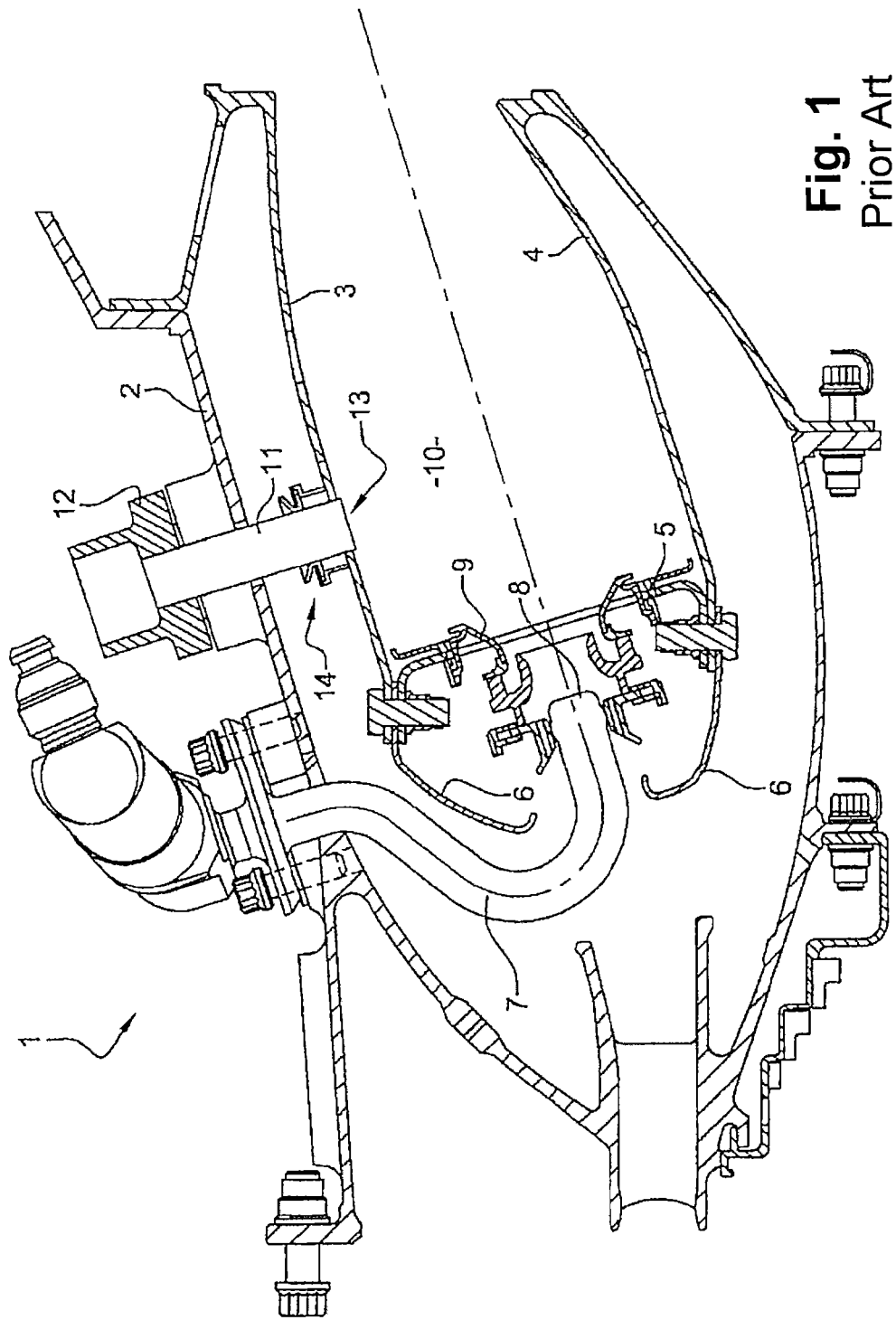
FIG. 1 is a longitudinal section view of a portion of a prior art annular combustion chamber.
Figure 2:
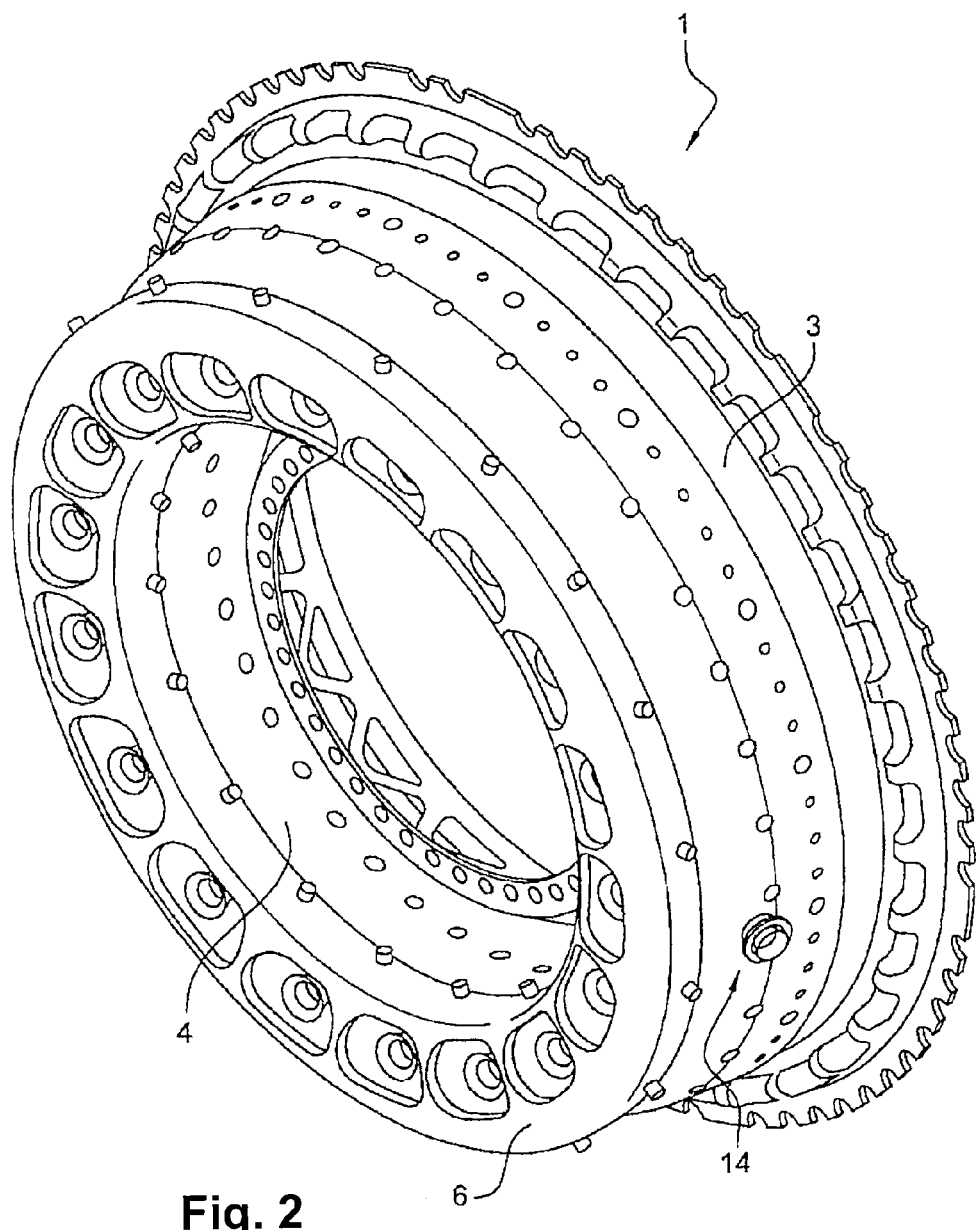
FIG. 2 is a perspective view of a portion of the FIG. 1 annular combustion chamber.

In the prior art as shown in FIGS. 1 and 2, an annular combustion chamber 1 of a turbine engine such as an airplane turboprop or turbojet is mounted in an outer casing 2 and comprises an outer shroud 3 forming a body of revolution with a downstream annular flange for fastening to the casing 2, an inner shroud 4, also forming a body of revolution with a downstream annular flange for mounting on an inner casing, and a chamber end wall 5 having fairings 6 mounted thereon that extend upstream.

Fuel injection pipes 7 distributed around the axis of the turbine engine open out into the chamber end wall 5 via injection heads 8. Deflectors 9 are arranged around each injection head 8.

The stream of air delivered by the compressor of the turbine engine is guided by the fairings 6 and split into a central passage for feeding the combustion chamber 1 and two outer passages that go around the combustion chamber.

The deflectors 9 form an incoming air stream that is turbulent in a primary combustion zone 10 of the combustion chamber 1. This air is mixed with fuel sprayed by the injection heads 8, the mixture being ignited by at least one sparkplug 11.

Via its outer end, the sparkplug 11 is mounted on an adapter 12 that is fastened to the outer casing 2. The inner end of the sparkplug 11 passes through an orifice 13 formed in the outer shroud 3 so as to be flush with the inside surface of the outer shroud 3.

Figure 3:
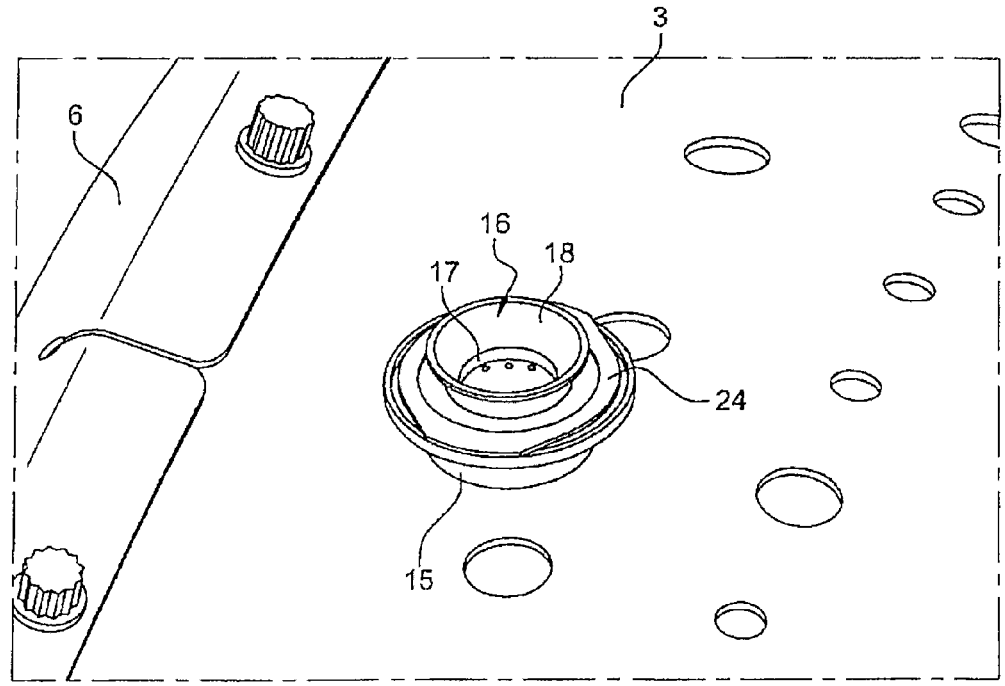
FIG. 3 is an enlarged view of sparkplug guide means used in the combustion chamber of FIGS. 1 and 2.
Figure 4:
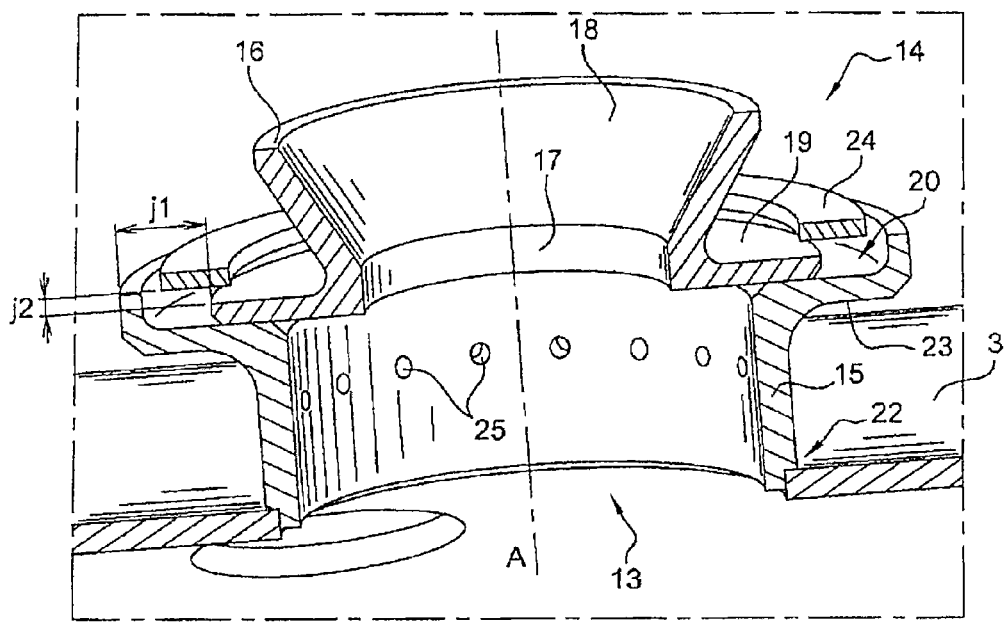
FIG. 4 is a center section view of the FIG. 3 guide means.

The orifice 13 is fitted with guide means 14 for guiding the sparkplug 11, which guide means comprise a chimney 15 (FIGS. 3 and 4) that is fastened to the outer shroud 3 and that opens out into the chamber 10 via said orifice 13, together with a guide 16 surrounding the sparkplug and mounted on the chimney 15 with axial clearance j1 and transverse clearance j2. The guide 16 has a cylindrical inside surface 17 for surrounding the sparkplug 11, its end closer to the outer casing 2 is connected to a frustoconical surface 18, and its opposite end is connected to an annular collar 19 that is designed to be engaged with clearance in an internal annular groove 20 in the chimney 15.

At least part of the frustoconical surface 18 extends into the air flow passage 21 situated outside the chamber. As mentioned above, the air that flows in this passage 21 presses the guide 16 against the sparkplug 11, and under the combined effect of vibration in operation, it may cause the guide 16 to turn relative to the sparkplug 11, thereby giving rise to more or less rapid wear of the sparkplug 11.

The sparkplug is generally cylindrical in shape and circular in section. A radially inner end 22 of the chimney 15 is mounted on and welded to the shroud 3 via a shoulder bearing against the edge of the orifice 13 and facilitating positioning of the chimney 15.

The outer end of the chimney includes an annular rim 23 extending radially outwards from the axis A of the chimney 15, and having an annular plate 24 fastened thereon that extends parallel to the rim 23 and that co-operates therewith to define the internal annular groove 20.

The collar 19 of the guide extends in the annular groove 20 with radial clearance j1 being formed between the peripheral edge of the collar 19 and the bottom of the groove 20, and with axial clearance j2 also being formed between the collar 19 and the annular wall 24.

These clearances j1 and j2, and also the sliding of the sparkplug 11 in the guide 16, serve to compensate for the relative shifts and movements between the sparkplug 11 and the chimney 15, as caused by the expansions due to the high temperatures that appear while the turbine engine is in operation.

Cooling holes 25 (FIG. 4) are also formed through the cylindrical wall of the chimney 15. In operation, air from the peripheral passage 21 enters into the chimney 15 via the holes 25, so as to cool the sparkplug 11.

Figure 5:
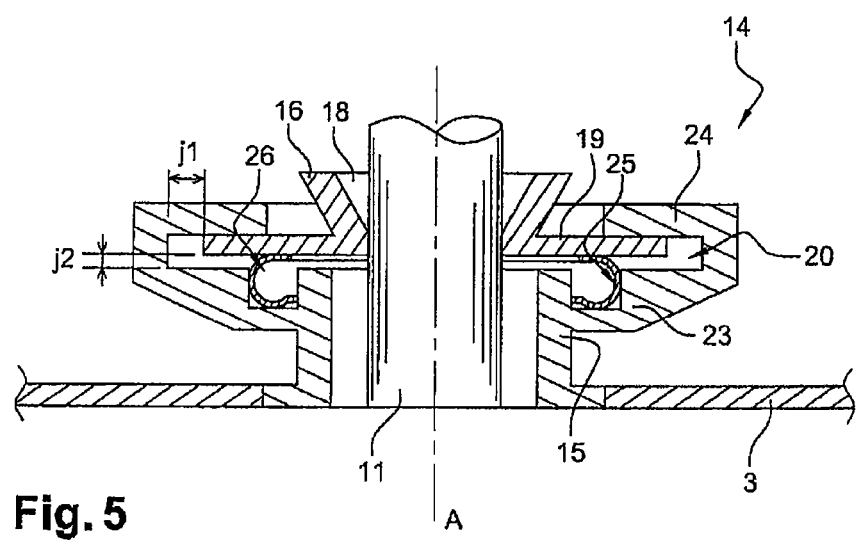
FIG. 5 is a center section view of guide means in a first embodiment of the invention.
Figure 6:
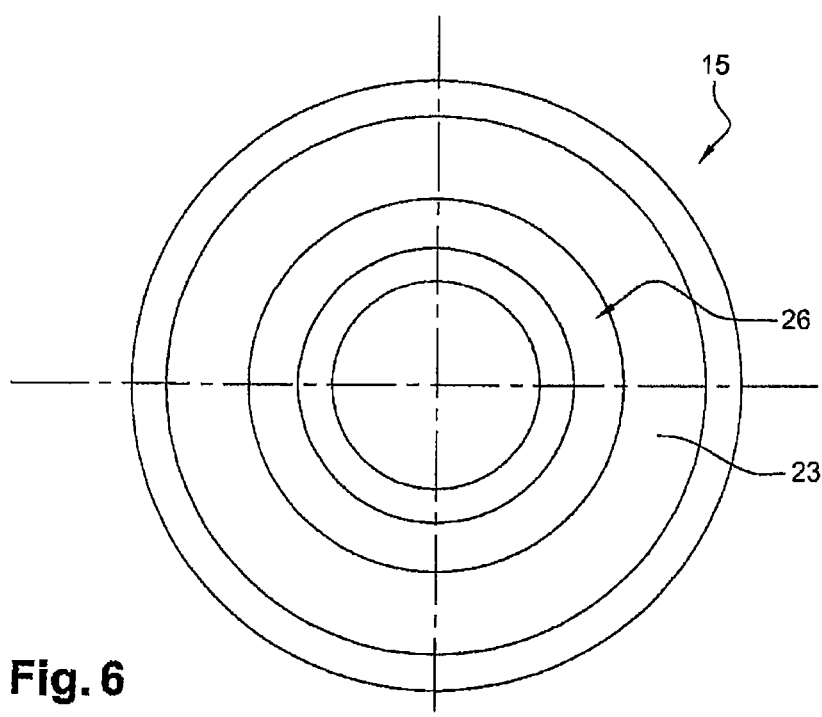
FIG. 6 is a plan view of the chimney of the FIG. 5 guide means.
Figure 7:
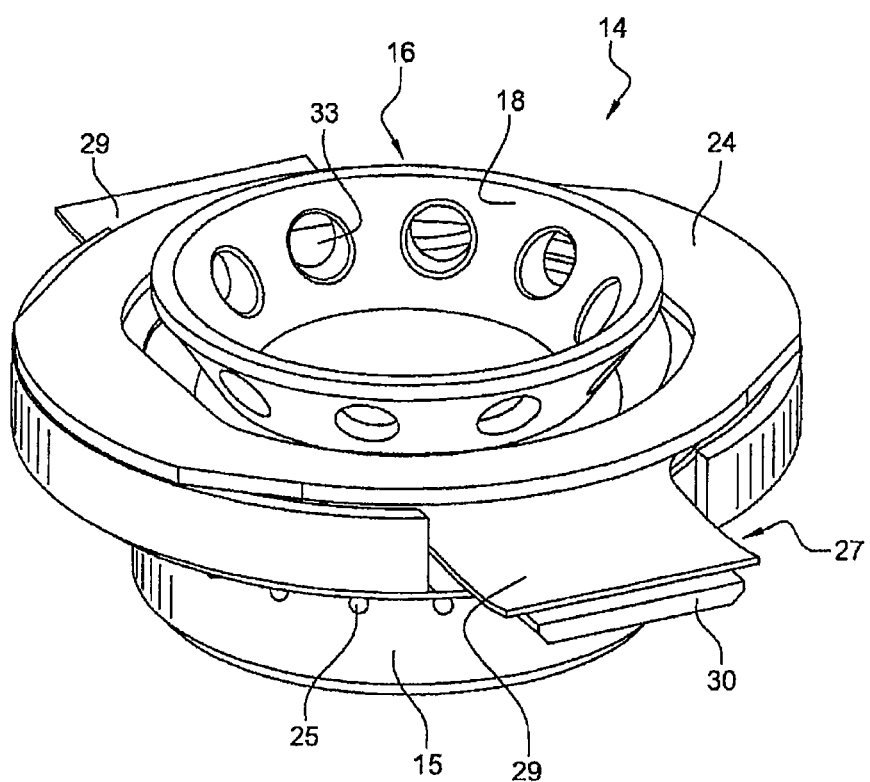
FIG. 7 is a perspective view of the guide means in a second embodiment of the invention.
Figure 8:
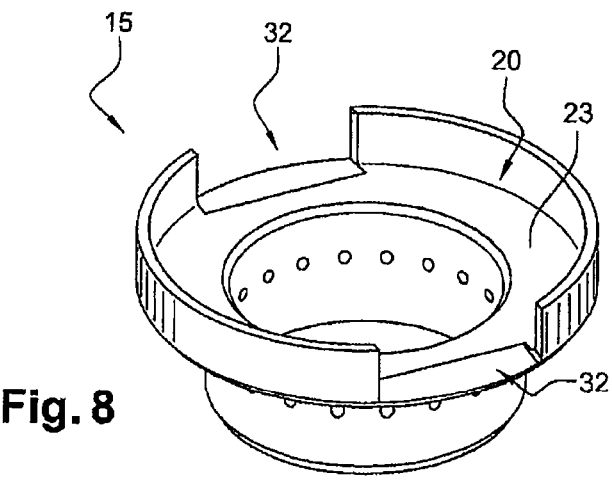
FIG. 8 is a perspective view of the FIG. 7 chimney.
Figure 9:
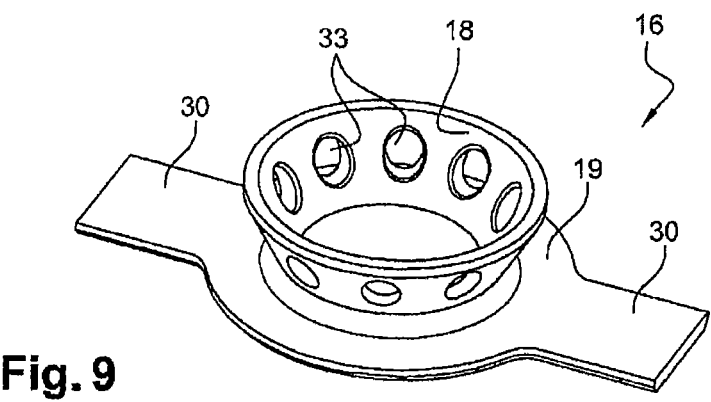
FIG. 9 is a perspective view of the FIG. 7 tubular guide.

FIGS. 5 and 6 show guide means 14 in a first embodiment of the invention, which guide means differ from the above-described guide means in that the annular collar 19 is pressed against the inside surface of the annular plate 24 by a resilient member 25 mounted in the groove 20.

More particularly, an annular groove 26 is formed in the rim 23 and opens out into its outside face. By way of example, the resilient member 25 is a spring or a spring washer having a C-shaped section as shown in FIG. 5, or an Ω-shaped section.

One edge of the resilient member 25 rests against the bottom of the groove 26, while its other edge bears against the inside face of the collar 19 so as to urge the collar outwards, thereby taking up the clearance j2.

The clearance j2 is thus situated between the inside face of the collar 19 and the rim 23.

In this way, while the turbine engine is in operation, the resilient member 25 limits the vibration of the guide 16 and damps that vibration by friction between the collar 19 and the annular plate 24, thereby reducing wear of the sparkplug 11.

Nevertheless it still allows the collar 19 to move in the groove 20, i.e. it allows the guide 16 to move relative to the chimney 15 as needed to compensate for the expansions that occur during different stages of flight.

FIGS. 7 to 12 show a second embodiment of the invention in which the annular collar 19 is urged to press against the radial annular rim 23 of the chimney 15 by means of a spring blade 27 of undulating shape, which blade is located between the tubular guide 16 and the annular plate 24.

Figure 10:
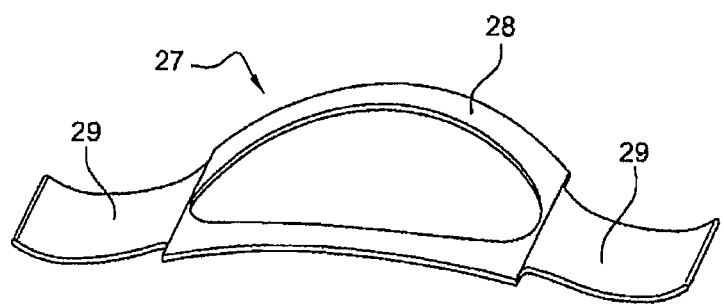
FIG. 10 is a perspective view of the spring blade of FIG. 7.
Figure 11:
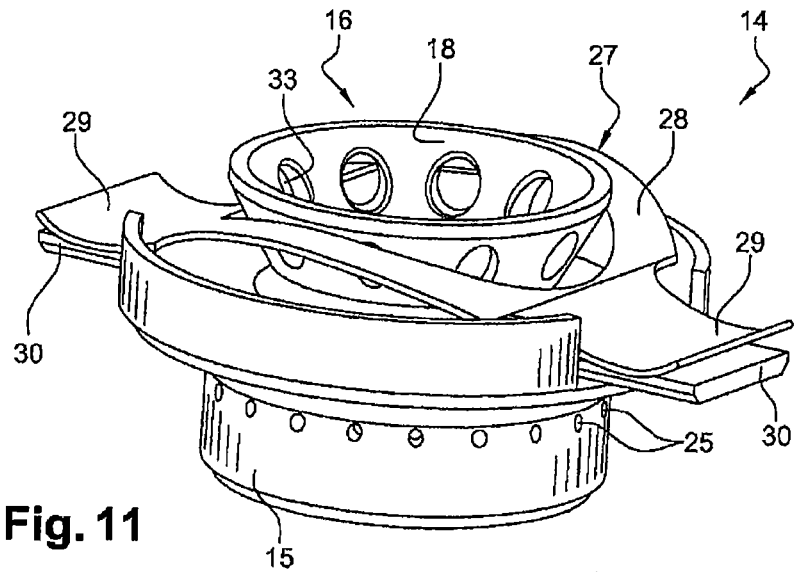
FIG. 11 is a perspective view of the FIG. 7 guide means, from which the annular plate has been removed.
Figure 12:
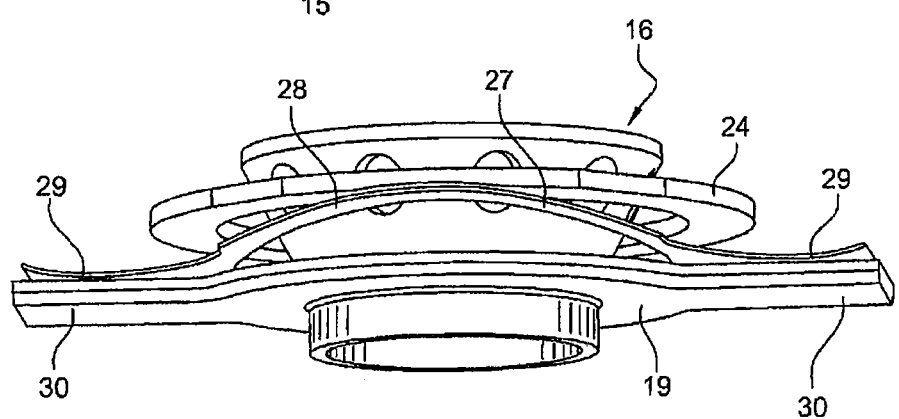
FIG. 12 is a perspective view showing the tubular guide, the spring blade, and the annular plate of FIG. 7 when assembled together.
Figure 13:
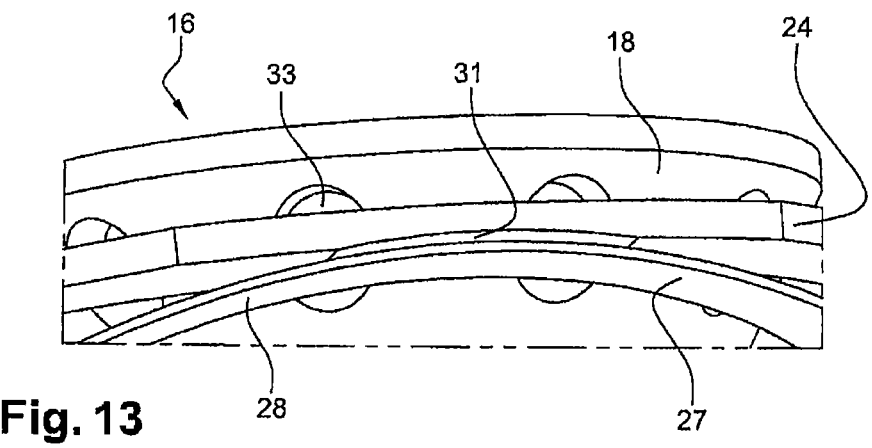
FIG. 13 is a detail view of FIG. 12, showing the zone where the spring blade presses against the annular plate.

As can be seen more clearly in FIGS. 10 to 12, the spring blade 27 has a convex annular central zone 28 surrounding the frustoconical wall 18 of the tubular guide 16 and bearing against the annular plate 24, together with two curved ends 29 bearing against two opposite support tabs 30 of the tubular guide 16 that extends radially outwards from the collar 19. The annular plate 24 includes a setback or indentation 31 of shape that is complementary to the shape of the convex central zone 28 of the spring blade 27.

The cylindrical portion of the rim 23 of the chimney has two openings 32 (FIG. 8) through which the support tabs 30 of the tubular guide 16 extend together with the ends 29 of the spring blade 27.

The frustoconical surface 18 of the guide 16 also includes openings 33 that are regularly distributed around its entire circumference.

The way in which the guide means 14 are mounted is described below in greater detail. Initially, the tubular guide 16 is put into place in the groove 20 of the chimney 15, with the tabs 30 of the guide 16 extending through the openings 32. The spring blade 27 is then mounted around the frustoconical wall 18 of the tubular guide 16, with the ends 29 of the blade 27 bearing against the tabs 30 of the guide 16 by passing through the openings 32 (FIG. 11).

Turning A of the spring blade 27 and of the guide 18 about the axis of the chimney is limited by the side edges of the openings 32. Nevertheless, clearance exists in operation allowing a small amount of annular movement between the chimney and both the guide 16 and the spring blade 27.

The spring blade 27 is then put under stress when the annular plate 24 is put into place. During this stage, as a result of it becoming deformed, the spring blade 27 lengthens and its ends 29 slide outwards along the tabs 30 of the guide 16.

The setback 31 formed in the annular plate 24 enables the spring blade to be kept in position.

The invention claimed is:

1. A turbine engine combustion chamber comprising:
at least one ignition sparkplug carried by an outer casing and extending through guide means carried by a wall forming a body of revolution of the chamber;
the guide means comprising a tubular guide having the sparkplug passing axially therethrough, which guide is mounted with axial and transverse clearance on a chimney fastened to the wall of the chamber and opening out therein, the guide including an annular collar engaged with clearance in an internal annular groove of the chimney,
wherein the annular collar is urged to press against a wall of the groove by a resilient member mounted in the groove.

2. A combustion chamber according to claim 1, wherein the resilient member is a spring or a spring washer.

3. A combustion chamber according to claim 1, wherein the resilient member presents a C-shaped or Ω-shaped section.

4. A combustion chamber according to claim 1, wherein the annular groove is defined by two parallel walls that are substantially radial relative to the axis of the chimney, the resilient member being placed in an annular groove formed in one of the walls.

5. A combustion chamber according to claim 1, wherein a wall of the groove is formed by a radial annular rim of the chimney and the resilient member is housed in a groove in the rim.

6. A combustion chamber according to claim 5, wherein the wall of the groove against which the collar is pressed by the resilient member is formed by an annular plate fastened to the rim of the chimney.

7. A combustion chamber according to claim 1, wherein the resilient member is a spring blade of undulating shape.

8. A combustion chamber according to claim 7, wherein the spring blade comprises an annular central zone surrounding the tubular guide, together with two ends bearing against two opposite support tabs of the tubular guide extending radially outwards from the collar.

9. A combustion chamber according to claim 8, wherein the chimney includes two openings through which there extend the support tabs of the tubular guide and the ends of the spring blade.

10. A combustion chamber according to claim 7, wherein the wall of the groove against which the collar of the guide is pressed is formed by a radial annular rim of the chimney, the spring blade bearing against an opposite wall of the groove.

11. A combustion chamber according to claim 10, wherein the opposite wall of the groove includes a setback of shape complementary to the shape of the spring blade and is configured to hold it in position.

12. A turbine engine or a turboprop or a turbojet, comprising an annular combustion chamber according to claim 1.

* * * * *